United States Patent [19]

Noyori et al.

[11] Patent Number: 4,542,477
[45] Date of Patent: Sep. 17, 1985

[54] INFORMATION RETRIEVAL DEVICE

[75] Inventors: Masato Noyori; Hiroyoshi Saitou; Masamitsu Sato; Kiyoshi Kikuchi, all of Kawasaki, Japan

[73] Assignee: The President of the Agency of Industrial Science & Technology, Tokyo, Japan

[21] Appl. No.: 579,756

[22] Filed: Feb. 15, 1984

Related U.S. Application Data

[63] Continuation of Ser. No. 250,020, Apr. 1, 1981, abandoned.

[30] Foreign Application Priority Data

May 30, 1980 [JP] Japan .................................. 55-71517

[51] Int. Cl.⁴ ........................ G06F 15/02; G06F 15/40
[52] U.S. Cl. .................................................. 364/900
[58] Field of Search ............................ 364/200, 900

[56] References Cited

U.S. PATENT DOCUMENTS 3,737,852  6/1973  Robinson ................. 340/146.3 WD
3,781,809 12/1973  Murakoshi et al. ................ 364/900
3,932,859  1/1976  Kyriakides et al. ................ 364/900
3,992,700 11/1976  Nakazawa et al. ................ 364/900
3,996,569 12/1976  Saunders ............................ 364/200
4,139,898  2/1979  Tanaka ................................ 364/900
4,158,236  6/1979  Levy .................................. 364/900
4,159,536  6/1979  Kehoe et al. ...................... 364/900
4,179,743 12/1979  Suzuki et al. ...................... 364/900
4,339,806  7/1982  Yoshida et al. .................... 364/900
4,384,329  5/1983  Rosenbaum et al. .............. 364/300

Primary Examiner—Eddie P. Chan

[57] ABSTRACT

An information retrieval system in which various information is indexed synthetically into such relations as the synonym, the broader term and the narrower term to provide a thesaurus and the words are coded to provide a keyword relation table, an index table and a word table each stored in a memory device respectively so that the desired information retrieval operation may be conveniently performed with use of a computer system. Particularly, a memory capacity even for memory of the thesaurus of large scale may be reduced considerably with simplification of the computer system.

1 Claim, 3 Drawing Figures

INFORMATION RETRIEVAL DEVICE

This is a continuation application of Ser. No. 250,020 filed Apr. 1, 1981, abandoned.

FIELD OF THE INVENTION

This invention is concerned with an information retrieval device which may perform both the information storage and retrieval conveniently.

BACKGROUND OF THE INVENTION

In the latest remarkably developed information society, a convenient indexing of the extensive amount of information together with the filing and the efficient retrieval thereof when desired is required. For example, the information retrieval systems with use of a computer for literature, patent publications, news and the like have been placed in practical use.

Hitherto, there has been provided an information retrieval system in which information is indexed with keywords for memory in the memory device and the keyword is retrieved for extraction of the desired information. In the information retrieval system of this type, an accurate grasp of the relation between each of the keywords is required to perform retrieval of high quality.

Generally, the relationship between keywords include such relationships as those between synonyms; for example; the electric calculator and the computer, the broader term and the narrower term for example the computer and the microcomputer, the semi-synonym and a related words and the like and those relations may be consolidated into the so-called thesaurus.

The thesaurus is usually made into a book form so that the information retrieval may be performed by manually turning over the leaves of the book which is however cumbersome in transaction and rather disturbs its incorporation with the filing system and an efficient information retrieval.

It has now been found that a retrieval of the thesaurus of large scale may be conveniently performed by an improved information retrieval device in which keywords are coded to prepare, in relation to the thesaurus, a keyword relation table which includes identification keywords and their related keywords. The identification keyword of the keyword relation table of the identical heading characters are collected into a group to provide an index table in which a start address and an end address are defined, a word table in which the characters of the keyword and the codes are arranged in contrast, and a keyword relation table. The index table and the word table, thus prepared, are stored in a memory device so that the desired keyword may be retrieved from the foregoing tables with use of a convenient computer system.

An information retrieval device according to the invention may be comprised of an input device such as a keyboard, a thesaurus retrieving section with a microcomputer accommodated therein, memory devices for storing a keyword relation table, an index table and a word table respectively, a thesaurus control unit with a microcomputer accommodated therein to issue a retrieval instruction directly to each memory device and an output device of CRT display.

In accordance with the information retrieval device of the invention, a thesaurus of large scale may be stored despite the use of a relatively simple circuit arrangement and the retrieval control system may be more simplified to ensure a convenient operation of the device.

SUMMARY OF THE INVENTION

A general object of the invention is, therefore, to provide an information retrieval device in which a thesaurus representing relationships between two or more keywords is stored so that the thesaurus retrieval may be performed conveniently and efficiently.

A principal object of the invention is to provide an information retrieval device which comprises an input device functioning to input a keyword intended to be retrieved and a control instruction, a thesaurus retrieval section which in response to an input signal from the input device gives a retrieval control instruction to a keyword relation table prepared in relation to the thesaurus by coding the keyword into a reference symbol, a thesaurus section for storing the keyword relation table, an index table and a word table to perform the keyword retrieval in response to the retrieval control instruction from the thesaurus control retrieval section and an output device for displaying in response to the control instruction from the thesaurus retrieval section a keyword retrieved at the thesaurus section.

The input device preferably comprises a keyboard which includes a character key for inputting a character row of the keyword and a function key for ordering the initiation of a reset and a retrieval command.

The thesaurus retrieval section includes a retrieval control unit connected to the input device, the thesaurus section and the output device for controlling the thesaurus section, a memory for storing the keyword input from the input device, a memory for storing an identification keyword measured from the thesaurus section, a circuit for comparing the input keyword with the identification keyword and a memory for storing a relation keyword corresponding to the identification keyword measured from the thesaurus section.

The thesaurus section includes a keyword relation table memory in which the keyword, classified and coded into the identification keyword, and the relation keyword are stored in relation to the thesaurus; an index table memory for storing a start address and an end address of the identification keywords of a group containing the identical heading characters in the keyword relation table memory; a word table memory for storing the keyword characters and the codes in contrast; a circuit for converting the keyword retrieved from the keyword relation table memory into the character code, with reference to the word table of the word table memory; and, a thesaurus control unit for ordering, in response to a control instruction signal from the thesaurus retrieval section, a retrieval of the keyword corresponding to the input keyword.

In the information retrieval device, of the invention, there is further provided a memory for storing a heading character code of the input keyword, a memory for storing a start address and an end address of the heading character codes retrieved from the index table memory, a memory for storing the identification keyword retrieved from the keyword relation table memory and the relation keyword and a memory for storing the keyword converted into the character code as a buffer. Moreover, the output device is provided with a character pattern generator and a CRT display.

Other objects and advantages of the invention will be more fully described with reference to the accompany-

PREFERRED EMBODIMENT OF THE INVENTION

Figure 1:
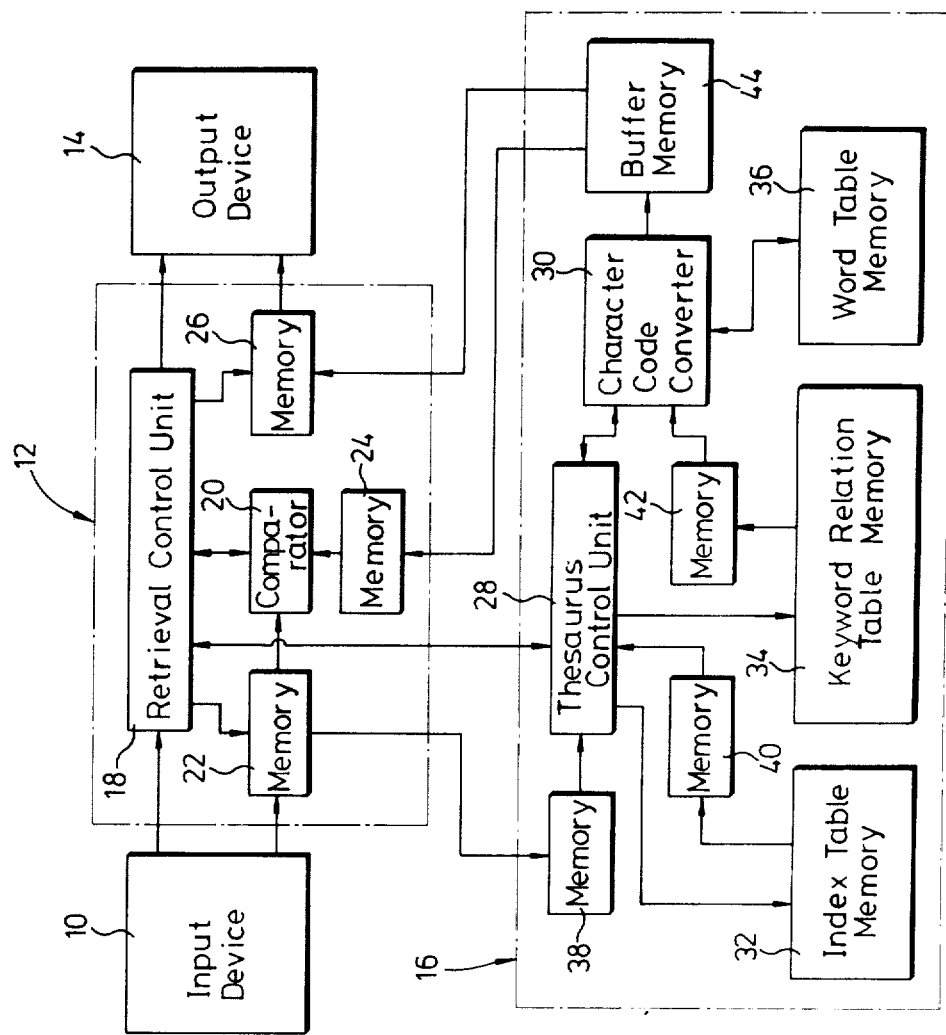
FIG. 1 is a block diagram illustrative of a whole arrangement of the information retrieval device according to the invention.

In FIG. 1, the information retrieval device according to the invention is essentially comprised of an input device 10, a thesaurus retrieval section 12, an output device 14 and a thesaurus section 16.

The input device 10 comprises typically a keyboard which includes character keys for inputting the character code string of the keyword and function keys for instructing a reset and a retrieval initiation so that the character code and the control code are output in response to operations of the character keys and the function keys.

The thesaurus retrieval section 12 is conveniently constituted by a microcomputer which includes a retrieval control unit 18, a comparator 20 and memories 22, 24 and 26. The function keys of the input device 10 are actuated to provide a retrieval signal on the retrieval control unit 18 thereby to control the thesaurus retrieval motion. For example, the retrieval control unit 18 orders a reset of the system of the device according to the invention, a writing and reading of the information against the memories 22, 24 and 26 and also a comparison of the information at the comparator 20.

The memory 22 receives and stores the character code of the keyword by operation of the character key of the input device 10 under the control of the retrieval control unit 18 and then the stored character code is transmitted to the thesaurus 16 and supplied to one data input terminal of the comparator 20.

The memories 24 and 26 store the thesaurus information retrieved at and emitted from the thesaurus section 16 and the memory 24 feeds the stored information to the opposite data terminal of the comparator 20. At the comparator 20, the stored informations of the memories 22 and 24 are compared by an instruction signal from the retrieval control unit 18 and the resultant comparison data are provided on the retrieval control unit 18 where the retrieval operation is continued with reference to the comparison results.

The memory 26 supplies the stored thesaurus information to the output device 14 in accordance with the instruction from the retrieval control unit 18.

The output device 14 may be conveniently constituted by a CRT display and a word pattern generator. Accordingly, it will be appreciated that the output device 14 receives the character code signal of the keyword supplied from the thesaurus retrieval section 12 including the retrieval control unit 18 and the memory 26 and the character code signal is converted into the pattern signal by the word pattern generator for display in the CRT display.

The word pattern generator may be of an IC memory for example so that character code signal as an address data is applied to the memory from which the pattern data corresponding to the character code is read out. Thus, on the output device 14, the keyword received from the input device 10 and the retrieval instruction information thereof as well as the keyword retrieved at the thesaurus section may be displayed with specific relations.

The thesaurus section 16 includes a thesaurus control unit 28, a character code converter 30, an index table memory 32, a keyword relation table memory 34, a word table memory 36 and more than two memories 38, 40, 42 and 46. The thesaurus control unit 28 may be conveniently constituted by a microcomputer or a minicomputer and, in response to an instruction signal from the retrieval control unit 18 of the thesaurus retrieval section 12, thesaurus information, between the index table memory 32, the keyword relation table memory 34 and the character table memory 36, is read out. Namely, the heading character code of the input keyword supplied from the memory 22 of the thesaurus retrieval section 12 is applied to the memory 38 for storage therein while, in the thesaurus control unit 28, reading given by the thesaurus data is performed in the order of the index table memory 32 and the keyword relation table memory 34 with reference to the heading character code stored in the memory 38. The data read out from the index table memory 32 is stored in the memory 40 whereas the data read out from the keyword relation table memory 34 is stored in the memory 42.

The thesaurus control unit 28 actuates the character code converter 30 to convert the thesaurus retrieval data into the character code. The conversion of the thesaurus retrieval data into the character code by the character code converter 30 is performed with reference to the character code information stored in the word table memory 36. Thus, the character code or retrieval information converted at the character code converter 30 is stored in a buffer memory 44 which supplies the stored information to the memories 24 and 26 of the thesaurus retrieval section 12 respectively for display on the output device 14 as hereinbefore described.

The data file arrangement in the index table memory 32, the keyword relation table memory 34 and the word table memory 36 be described more fully in the followings:

The memories 32, 34 and 36 for the foregoing tables may be of an IC memory, a CCD memory, a magnetic disc or the like.

Figure 2:
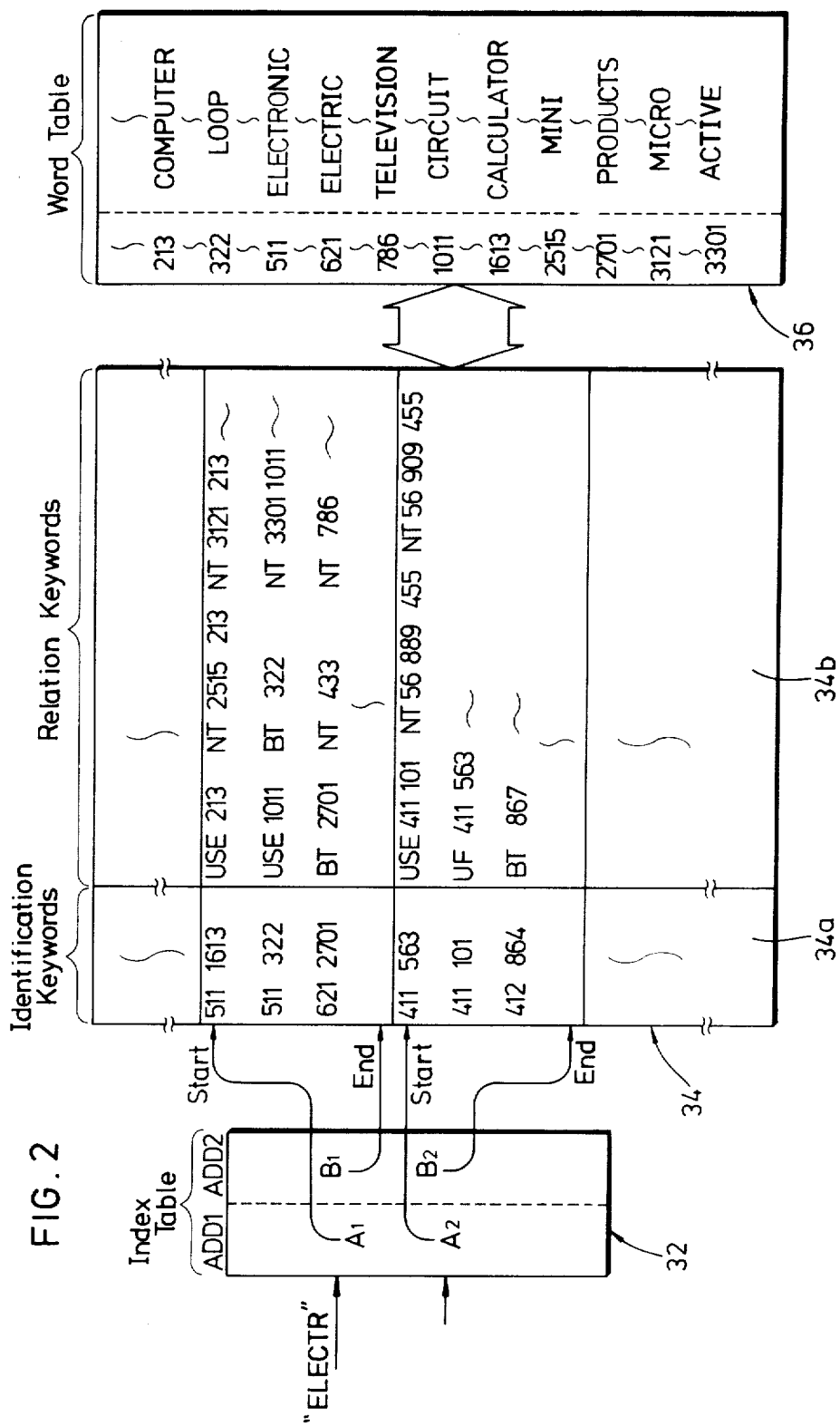
FIG. 2 is a pictorial diagram illustrative of a data file arrangement of a memory device for storing an index table, a keyword relation table and a word table.

FIG. 2 shows typical data file arrangements of the memories 32, 34 and 36 in which the keyword relation table to be stored in the keyword relation memory 34 includes an identification keyword section 34*a* and a relation keyword section 34*b*. In the identification keyword section 34*a* there is accommodated the identification keywords of the numerical code string corresponding to the word in the order of the numbers of the heading character codes.

Moreover, in the relation keyword section 34*b* are accommodated the keywords in the forms of the numerical code strings with specific relations to the identification keywords. These relation keywords are stored at the relation keyword 34*b* together with the relation codes such as "USE"; or, "UF" suggestive of the synonym; or, the relation codes such as "BT" suggestive of a broader term; or, "NT" suggestive of a narrower term.

In the keyword relation table, the identification keywords are stored in the identification keyword section 34a to provide a group containing the identical heading character codes. The start address (ADD1) and the end address (ADD2) identifying the storing positions of the heading character codes, corresponding to the identical heading character codes, are formed into a separate index table respectively which are in turn stored in the index table memory 32.

Further, in the word table stored in the word table memory device 36 there are arranged in contrast the word codes of the numerical row shown in the keyword relation table and the character codes suggestive of the word codes.

The thesaurus retrieval operation of the device according to the invention shall be generally described hereinafter with reference to the index table, the keyword relation table and the word table as shown in FIG. 2.

When the retrieval is carried out for a heading character code "ELECTR", the start address $A_1$ and the end address $B_1$ of the keyword relation table (34) are determined by the index table (32) and the keywords from the address $A_1$ to the address $B_1$ of the keyword relation table 34 are sequentially retrieved. Moreover, when another heading character code is input into the index table 32, the keywords from the start address $A_2$ to the end address $B_2$ in the keyword relation table 34 are sequentially retrieved.

Further description shall be continued with respect to the keyword indicated by the start address $A_1$ in the keyword relation table. Namely, in the address $A_1$ a keyword such as "an electric calculator" represented by the numerical code string "511 1613" as an identification keyword is stored and there is presented the relation keywords as "the synonym computer" represented by the code "USE 213", "the narrower term: microcomputer" represented by the code "NT 2515 213" and "the narrower term: microcomputer" represented by the code "NT 3121 213". The retrieved keyword is referred to the word table (36) through the character code converter 30 for display on the output device 14.

Figure 3:
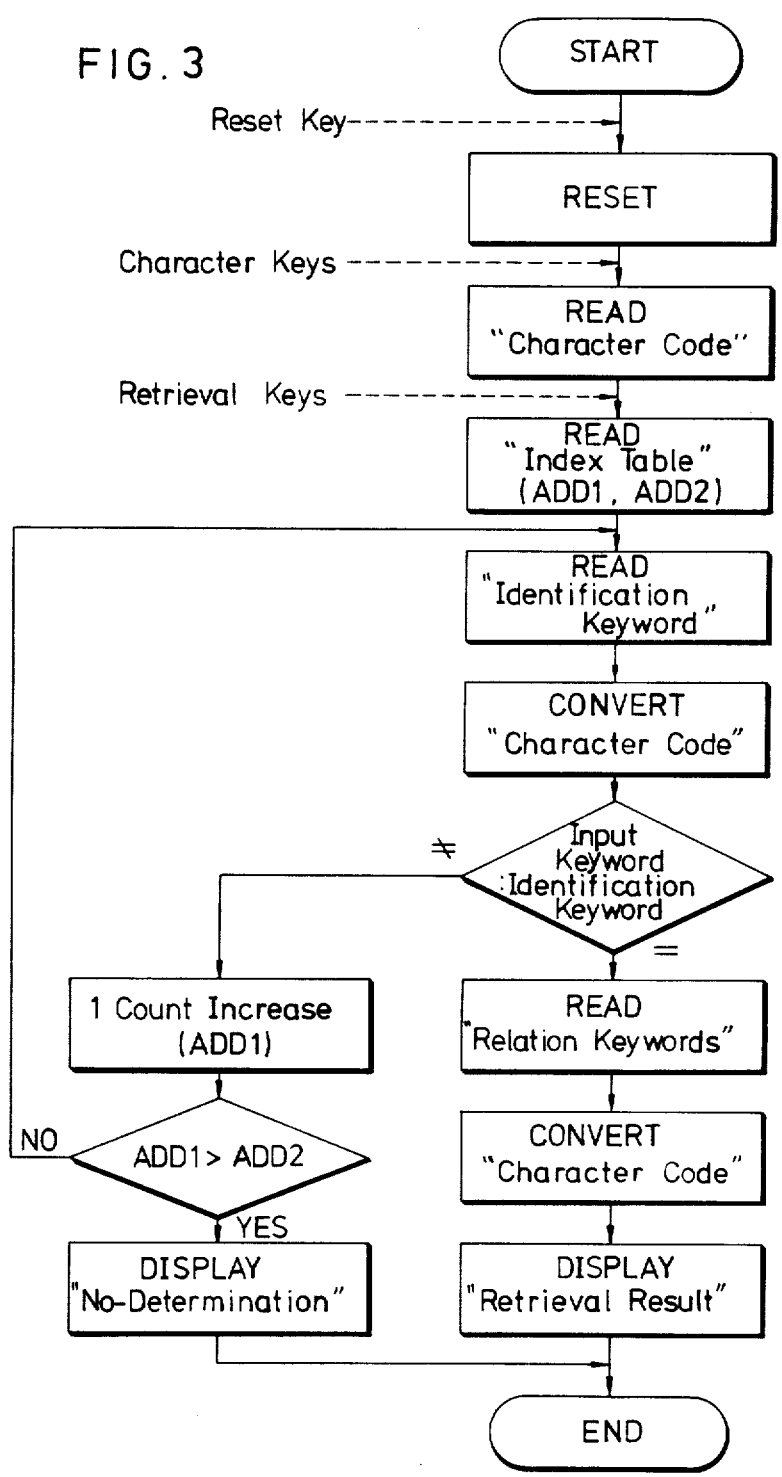
FIG. 3 is a flow chart illustrative of a control system of the information retrieval device according to the invention.

The thesaurus retrieval operation of the information retrieval device according to the invention shall be more fully described hereinafter with reference to a fundamental control flow chart of FIG. 3.

(1) A reset key of the input device 10 is primarily operated so that the retrieval control section 18 orders all components of the information retrieval device for the initial reset or initiation.

(2) Secondly, the character key of the input device 10 is with operated to input of the keyword so that the retrieval control unit 18 orders the sequential writing of the character code string of the input keyword into the memory 22.

(3) Then, the retrieval start key of the input device 10 is operated so that the retrieval control unit 18 orders the thesaurus control unit 28 to read the identification keyword.

(4) The thesaurus control section 28 orders the memory 38 to read out only the heading character codes of the input keyboard stored in the memory 22 for writing therein in accordance with the reading instruction of the identification keyword.

(5) Further, the thesaurus control unit 28 orders, in accordance with the heading character codes written into the memory 38, to the storage of the index table in the index table memory 32 and the reading of the retrieved address including the start address ADD1 and the end address ADD2 by the memory 40 for writing therein.

(6) Moreover, the thesaurus control unit 28 orders in accordance with the address written into the memory 40, the reading of the identification keywords of the keyword relation table stored in the keyword relation table memory 34 and the storage of the read-out identification keywords in the memory 42.

(7) The identification keywords stored in the memory 42 are input into the character code converter 30 which in turn orders in accordance with the input identification keywords, the reading of the character code string with reference to the word table stored in the word table memory 36 and the writing of the read-out results into the memory 44.

(8) The termination of the character code conversion at the character code converter 30 is measured by the thesaurus control unit 28 for subsequent transmission into the retrieval control unit 18.

(9) The retrieval control unit 18 then orders the writing of the identification keywords stored in the memory 44 into the memory 24 and the comparison at the comparator 20 of the memory 22 with the retrieved identification keywords received from the memory 24. The comparator 20 determines an identity between the input keyword and the retrieved identification keyword and the result is input into the retrieval control unit 18.

(10) When an inconsistency is determined at the comparator 20, the thesaurus control unit 28 orders the increase of the address (ADD1) indicating the identification keyword for one count and the reading out of the identification keyword in the following address and also the repeating of the retrieval of the identification keyword in the orders of the foregoing items (6) to (9). The repetitive retrieval is continued until the determination at the comparator 20 coincides with consecutive count up over all the address group composed of the identical heading characters and is discontinued at the condition of the address ADD1>ADD2.

(11) When no identification keyword corresponding to the input keyword is retrieved by the foregoing repetitive retrieval, the retrieval control unit 18 orders the output device 14 to display "no-determination".

(12) While, when the results of the determination at the comparator 20 come to coincidence by the retrieval carried out as described in the foregoing items (9) and (10), the retrieval control unit 18 orders the thesaurus control unit 28 to read the relation keywords corresponding to the retrieved identification keywords.

(13) The address of the identification keywords, which are in accord the input keywords, are thus fixed and the relation keywords stored, in the predetermined address of the keyword relation table memory 34, are sequentially read out and the resultant relation keywords are stored in the memory 42.

(14) Thereafter, the relation keywords stored in the memory 42 are input into the character code converter 30 which in turn orders in accordance with the input relation keywords, the reading of the character code string with sequential reference to the word table stored in the word table memory 26 and the writing of the character code string into the memory 44.

(15) The termination of the character code conversion of all the relation keywords at the character code converter 30 is measured at the thesaurus control unit 28 for further transmission into the retrieval control unit 18. This in turn orders the transfer of the relation keyword converted into the character code and stored in the memory 44, to the memory 26.

(16) Then, the retrieval control unit 18 orders the display of the relation keyword stored in the memory 26 and the identification keyword stored in the memory 24 on the output device 14.

(17) Thus, the thesaurus retrieval for the input keyword is finished realizing the retrieval result from the data displayed on the output device 14.

From the foregoing description, it will be appreciated that, in accordance with the invention, the keywords are stored as the information data in contrast with the word codes according to the thesaurus. This enables the provision of a convenient retrieval of the keyword. Namely, keywords are subjected to the word coding with considerable reduction in the capacity of the memory for storing the thesaurus. For example, when the keyword such as "a large scale computer system" is stored in the form of a conventional character code, the capacity of eighteen byte is required, provided one character requires two byte capacity. On the other hand, in the information retrieval device according to the invention, six byte capacity is sufficient for storage provided an individual word requires two byte capacity.

Further, the character coding of the keyword according to the invention permits various combinations thereof with considerable increment of the keyword numbers for storage. Accordingly, the data file arrangement of the memory device for storing the keywords may be simplified with further simplifications of not only the control system but also all the system components of the device.

The device according to the invention is convenient in transaction with enhancement of the efficiency of the retrieval operation which is merely ordered by a simple keyboard operation for display of the retrieval result on the output device.

The information retrieval device according to the invention is not limited to the foregoing embodiments. For example, in the embodiments described hereinbefore the comparison of the input keyword with the retrieval identification keywords by the comparator is effected with a class of the character code string. However, a class of the word code string may be used with such the advantages that the character code conversion by the comparing operation may be left out with reduction of the retrieval time.

Further, in the embodiment described the relation keywords are stored in the keyword relation table memory in the form of the word code string although a convenient sequence number of the identification keyword corresponding to the relation keyword may be used with further reduction of the memory capacity for storing the thesaurus.

What is claimed is:

1. An information retrieval system having a thesaurus displaying function and comprising a thesaurus section in which information is stored and from which information is to be retrieved and an operating section for effecting the retrieval, said operating section comprising input means forming part of the system for providing a character coded input keyword which determines the information to be retrieved from the thesaurus section, said input means also providing control instructions, a retrieval control means responsive to said control instructions provided by the input means for in turn providing control instructions for controlling the operation of said thesaurus section, and output means for displaying the retrieved information;

said thesaurus section including a word table memory having stored therein a predetermined thesaurus of information in character code and in corresponding numerical code;

a keyword relation table memory containing reference symbols comprising numerical codings of potential and anticipated keywords, each related to specific information in the thesaurus, said numerically coded keywords in the keyword relation table memory comprising identification keywords and relation keywords related to said identification keywords, said identification keywords being formed into groups, identification keywords of each group respectively having identical heading characters, identical heading characters in one group being different from identical heading characters of other groups;

an index table memory having stored therein a start address of the first identification keywords of each group in said keyword relation table memory and an end address of the last keyword of said group;

said thesaurus section further including a thesaurus control unit, said control unit reading out a group of said start addresses and said end addresses having heading characters identical to that of the character code of the input keyword from said index table memory in response to said control instructions from the retrieval control means as a function of the character code of the input keyword, said control unit generating sequentially addresses between said start and end addresses, which are then transferred to the keyword relation table memory to retrieve therefrom the numerically coded identification keywords, said unit causing said keyword relation table memory to supply the retrieved numerically coded identification keywords to a character code converter which is operatively connected to said word table memory for operatively supplying to said output means, on command of said retrieval control means, the character codes in said word table memory corresponding to the retrieved numerically coded identification keywords, first memory means in the operating section of the system for storing the character code information of the input keyboard, second memory means also in the operating section of the system for receiving and storing the character code information from the character code converter, comparator means in the operating section for comparing the information stored in said first and second memory means under control of an instruction signal from said retrieval control means until identity is established at which time the retrieval control means instructs the thesaurus control unit to retrieve those relation keywords in said keyword relation table memory which are related to the identification keyword corresponding to the input keyword and to display the relation keywords on the output means.

* * * * *